US011759765B1

(12) United States Patent
Abu-Jdayil et al.

(10) Patent No.: US 11,759,765 B1
(45) Date of Patent: Sep. 19, 2023

(54) METHODS OF MAKING AND USING A COMPOSITE MATERIAL, FOR DEHYDRATION OF GASES

(71) Applicant: UNITED ARAB EMIRATES UNIVERSITY, Al Ain (AE)

(72) Inventors: Basim Abu-Jdayil, Al Ain (AE); Hyder Al Abdallah, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 18/119,476

(22) Filed: Mar. 9, 2023

(51) Int. Cl.
| | |
|---|---|
| *B01J 20/22* | (2006.01) |
| *B01D 53/04* | (2006.01) |
| *B01J 20/24* | (2006.01) |
| *B01J 20/28* | (2006.01) |
| *B01J 20/30* | (2006.01) |
| *B01D 53/26* | (2006.01) |
| *B01D 53/28* | (2006.01) |
| *B01J 20/26* | (2006.01) |

(52) U.S. Cl.
CPC .............. *B01J 20/24* (2013.01); *B01D 53/04* (2013.01); *B01D 53/261* (2013.01); *B01D 53/28* (2013.01); *B01J 20/262* (2013.01); *B01J 20/28004* (2013.01); *B01J 20/28026* (2013.01); *B01J 20/3007* (2013.01); *B01J 20/3021* (2013.01); *B01J 20/3042* (2013.01); *B01J 20/3085* (2013.01); *B01D 2253/202* (2013.01); *B01D 2253/25* (2013.01); *B01D 2253/304* (2013.01); *B01D 2253/34* (2013.01); *B01D 2257/80* (2013.01)

(58) Field of Classification Search
CPC ...... B01D 53/04; B01D 53/261; B01D 53/28; B01D 2253/202; B01D 2253/25; B01D 2253/304; B01D 2253/34; B01D 2257/80; B01J 20/24; B01J 20/262; B01J 20/28004; B01J 20/28026; B01J 20/3007; B01J 20/3021; B01J 20/3042; B01J 20/3085
USPC ............... 95/90, 117; 96/108, 153; 502/401; 34/80, 472, 473
See application file for complete search history.

(56) References Cited

U.S. PATENT DOCUMENTS

| | | | |
|---|---|---|---|
| 10,655,009 B1 | 5/2020 | Abu-Jdayil et al. | |
| 2010/0107485 A1* | 5/2010 | Sugimoto | C10L 5/366 44/442 |
| 2019/0125914 A1* | 5/2019 | Luthe | B01D 53/02 |
| 2022/0056262 A1 | 2/2022 | Galiwango et al. | |

FOREIGN PATENT DOCUMENTS

| | | | |
|---|---|---|---|
| WO | WO 2020079700 A1 * | 4/2020 | |
| WO | 2022038578 A1 | 2/2022 | |

OTHER PUBLICATIONS

Amirou, Siham, et al. "Effects of corona discharge treatment on the mechanical properties of biocomposites from polylactic acid and Algerian date palm fibres." Scientific Research and Essays (SRE) 8.21 (2013): 946-952.
Kharrat, Fatma, et al. "The effect of the process on mechanical properties of polylactic acid-date palm leaf fibers composite films produced by extrusion blowing." Journal of Renewable Materials 7.9 (2019): 891-901.
Abu-Jdayil, Basim, et al. "Date palm wood waste-based composites for green thermal insulation boards." Journal of Building Engineering 43 (2021): 103224.
Al Abdallah, Hyder, et al. "The Effect of Alkaline Treatment on Poly (lactic acid)/Date Palm Wood Green Composites for Thermal Insulation." Polymers 14.6 (2022): 1143.
Mousa, Noran, et al. "A New Green Composite Based on Plasticized Polylactic Acid Mixed with Date Palm Waste for Single-Use Plastics Applications." Polymers 14.3 (2022): 574.
Awad, Said, et al. "Polylactic Acid (PLA) Reinforced with Date Palm Sheath Fiber Bio-Composites: Evaluation of Fiber Density, Geometry, and Content on the Physical and Mechanical Properties." Journal of Natural Fibers 20.1 (2023): 2143979.

* cited by examiner

Primary Examiner — Frank M Lawrence, Jr.
(74) Attorney, Agent, or Firm — Nath, Goldberg & Meyer; Richard C. Litman

(57) ABSTRACT

A method of making a composite material for dehydration of gases includes the steps of grinding date palm wood fibers to produce a fiber powder, immersing the fiber powder in an alkali solution, filtering fiber powder from the alkali solution to obtain treated fiber powder, drying the treated fiber powder, mixing the dried treated fiber powder with melted polylactic acid to form a composite material, extruding the composite material, and molding and pressing the extruded composite material. The resultant composite material may then be used to dehydrate gas by contacting the gas with the composite material such that water from the gas is adsorbed onto the surface of the composite material.

11 Claims, 4 Drawing Sheets

METHODS OF MAKING AND USING A COMPOSITE MATERIAL, FOR DEHYDRATION OF GASES

BACKGROUND OF THE INVENTION

Field of the Invention

The disclosure of the present patent application relates to the dehydration of gases, and particularly to making and using a composite material formed from renewable materials for the dehydration of gases.

Description of Related Art

Natural gas is an example of a common commercial gas which needs to be dehydrated in order to be stored and transported effectively. The two primary commercial methods used to dehydrate natural gas are absorption and adsorption. In the absorption method, materials including glycols are used to remove water from natural gas through absorption of moisture into glycol-containing materials. In the adsorption method, water is adsorbed into the surface of a molecular sieve, an alumina gel or a silica gel. Both absorption and adsorption typically make use of toxic chemicals which are neither biodegradable, recyclable nor renewable. Given present concerns about the environment and the prevalence of the usage of natural gas, it would be desirable to be able to replace the present commercial dehydration materials with materials which are safer and renewable. Thus, methods of making and using a composite material for dehydration of gases solving the aforementioned problems is desired.

SUMMARY OF THE INVENTION

A composite material for dehydration of gases is made by grinding date palm wood fibers to produce a fiber powder. The date palm wood fibers may be ground until the fiber powder has an average particle diameter of about 212 μm. The fiber powder is then immersed in an alkali solution. The alkali solution may be a 2 wt % aqueous solution of NaOH or KOH, with a concentration of about 10 g of the fiber powder added per 100 mL of the aqueous solution (10% w/v). The fiber powder may be immersed in the alkali solution for about two hours at room temperature. The alkaline treatment eliminates contaminants from the surfaces of the fiber powder particles, such as wax and dust, and also reduces the lignin and hemicellulose content of the fiber powder.

The fiber powder is then filtered from the alkali solution and dried to obtain treated fiber powder. The treated fiber powder may be dried at a temperature of about 95° C. for about two hours. The dried treated fiber powder is mixed with melted polylactic acid to form a composite material and this composite material is extruded for subsequent molding and pressing. The mixing may be performed in a melt extruder, which also produces the extruded composite material. The mixing of the dried treated fiber powder with the melted polylactic acid to form the composite material may be performed by adding the dried treated fiber powder to the melted polylactic acid such that a concentration of the date palm wood fiber in the composite material is between about 10 wt % and about 40 wt %. The resultant composite material may then be used to dehydrate gas by contacting the gas with the composite material such that water from the gas is adsorbed into the surface of the composite material.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
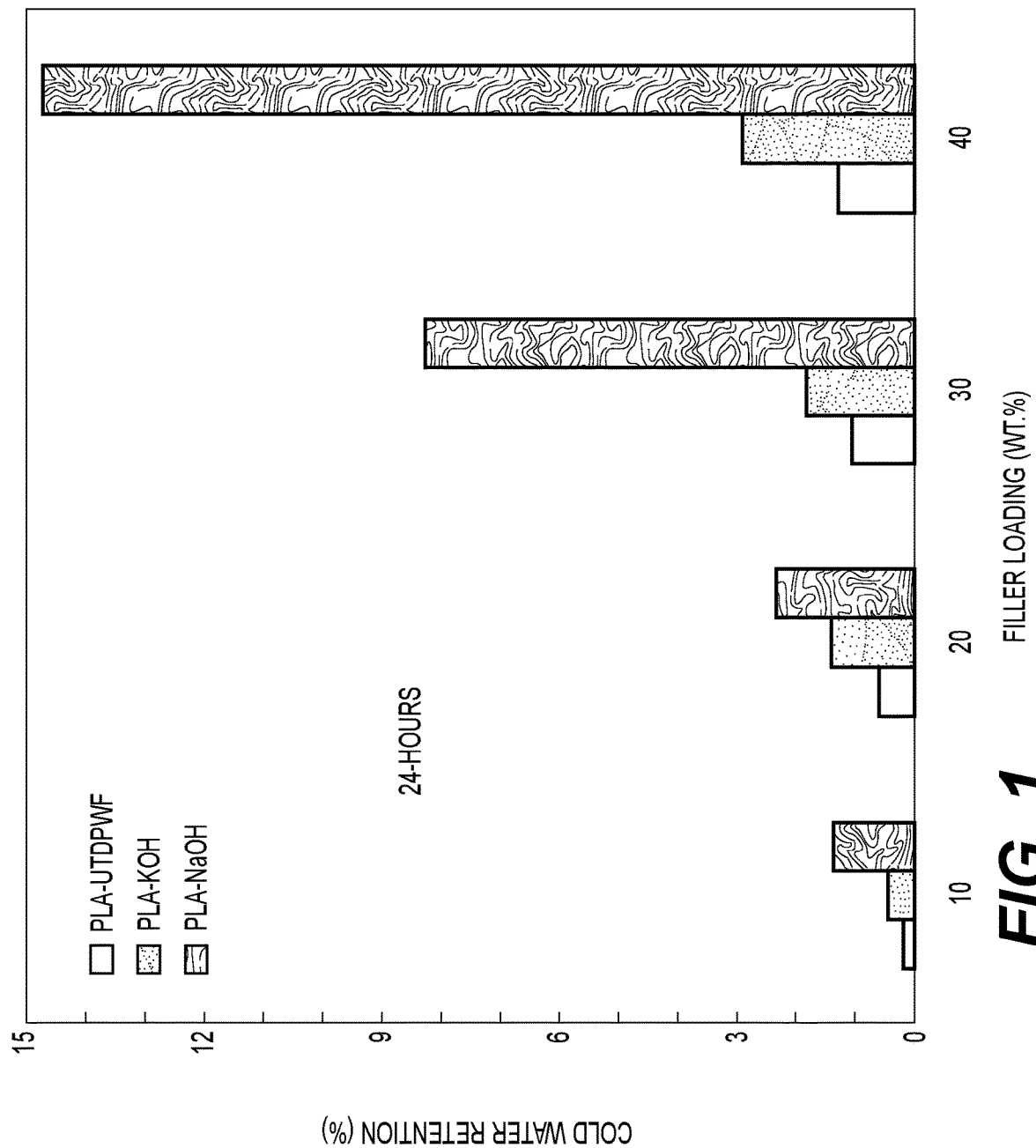
FIG. 1 is a graph comparing water retention results for composite material samples prepared according to the method of making a composite material for dehydration of gases at varying concentrations of date palm wood fiber, and also compared against an untreated control sample, where each sample was submerged in a cold water bath for 24 hours.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

A composite material for dehydration of gases is made by grinding date palm wood fibers to produce a fiber powder. As a non-limiting example, the date palm wood fibers may be ground until the fiber powder has an average particle diameter of about 212 μm. The fiber powder is then immersed in an alkali solution. As a non-limiting example, the alkali solution may be a 2 wt % aqueous solution of NaOH or KOH, with a concentration of about 10 g of the fiber powder added per 100 mL of the aqueous solution (about 10% w/v). As a further non-limiting example, the fiber powder may be immersed in the alkali solution for about two hours at room temperature. The alkaline treatment eliminates contaminants from the surfaces of the fiber powder particles, such as wax and dust, and also reduces the lignin and hemicellulose content of the fiber powder.

The treated fiber powder is then filtered from the alkali solution and dried. As a non-limiting example, the treated fiber powder may be dried at a temperature of about 95° C. for about two hours. The dried treated fiber powder is mixed with melted polylactic acid to form a composite material and this composite material is extruded for subsequent molding and pressing. The mixing may be performed in a melt extruder, which also produces the extruded composite material. The mixing of the dried treated fiber powder with the melted polylactic acid to form the composite material may be performed by adding the dried treated fiber powder to the melted polylactic acid such that a concentration of the date palm wood fiber in the composite material is between about 10 wt % and about 40 wt %. The resultant composite material may then be used to dehydrate gas by contacting the gas with the composite material such that water from the gas is adsorbed into the surface of the composite material.

As a non-limiting example, the extruded composite material may be molded in a cylindrical mold with a height of about 25.7 mm and a diameter of about 12.8 mm. The pressing thereof may be performed as a three-part process. As a non-limiting example, the molded extruded composite material may first be pressed at a pressure of about 0.0039 tons/mm$^2$ (about 0.50 tons applied over the about 128.68 mm$^2$ circular surface of the cylindrical mold) for about 320 seconds at a temperature of about 180° C., followed by a second pressing at a pressure of about 0.0040 tons/mm$^2$ (about 0.52 tons applied over the about 128.68 mm$^2$ circular surface) for about 240 seconds at a temperature of about 185° C., and a third pressing at a pressure of about 0.0233 tons/mm$^2$ (about 3.00 tons applied over the about 128.68 mm$^2$ circular surface) for about 210 seconds at a temperature of about 100° C.

In experiments, composite samples were prepared as described in the non-limiting examples discussed above, with a first set of samples prepared using an aqueous KOH solution (these samples are hereinafter referred to as "PLA-KOH"), a second set of samples prepared using an aqueous NaOH solution (these samples are hereinafter referred to as "PLA-NaOH"), and third set of control samples prepared with untreated date palm wood fiber (UDPWF); i.e., with no alkaline treatment (these samples are hereinafter referred to as "PLA-UTDPWF"). In the experiments, melt extrusion was performed using a HAAKE MiniLab II compounder manufactured by Thermo Scientific®, at a temperature of 190° C., a torque of 140 N·m, and a three minute retention time inside the extruder. Pressing was performed using a 4533 AutoFour/3015-PL automatic hydraulic heated laboratory press manufactured by Carver®. Samples of PLA-KOH, PLA-NaOH and PLA-UTDPWF were prepared with 10 wt %, 20 wt %, 30 wt % and 40 wt % date palm wood fiber filler concentrations.

Figure 2:
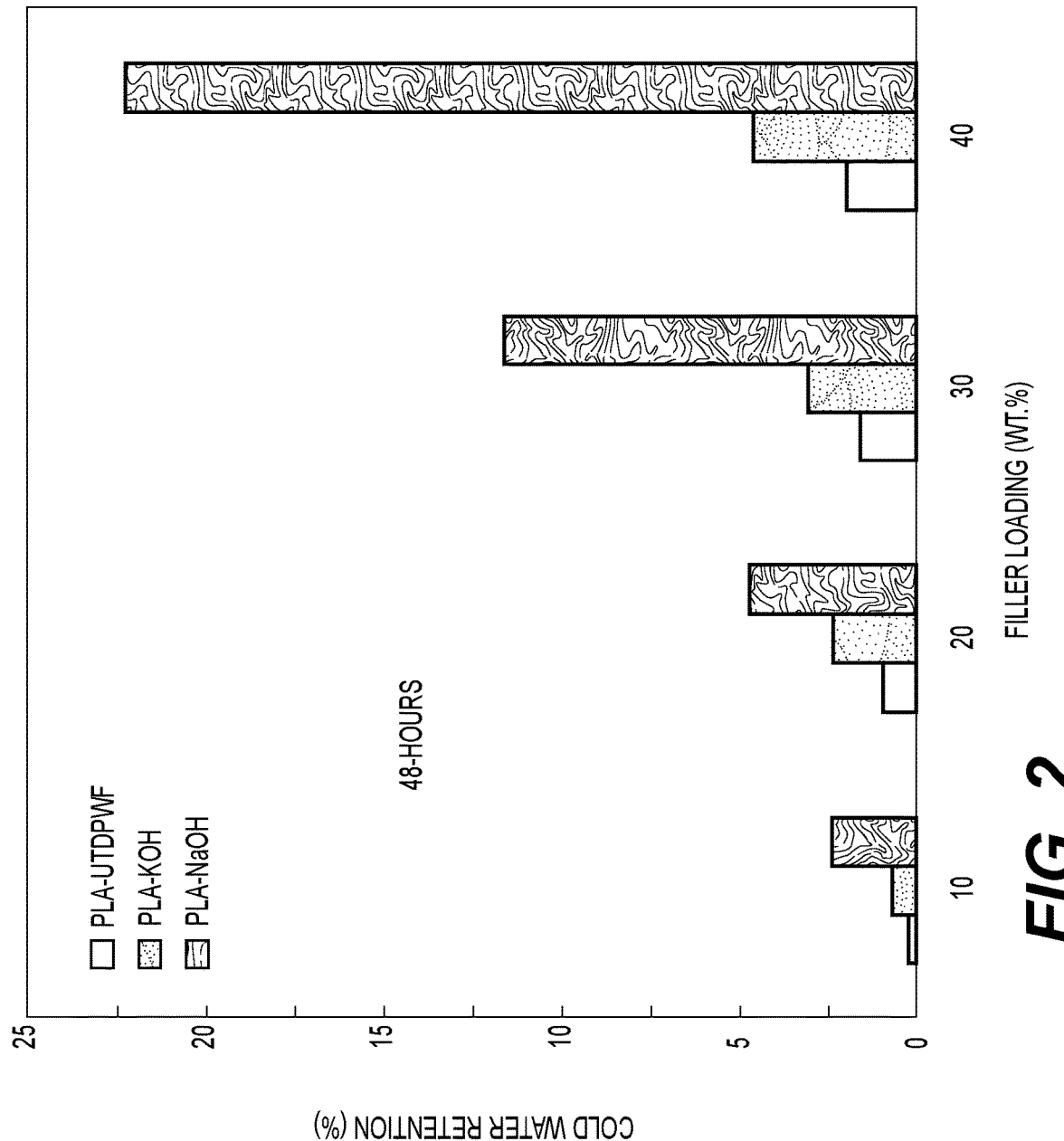
FIG. 2 is a graph comparing water retention results for composite material samples prepared according to the method of making a composite material for dehydration of gases at varying concentrations of date palm wood fiber, and also compared against an untreated control sample, where each sample was submerged in a cold water bath for 48 hours.
Figure 3:
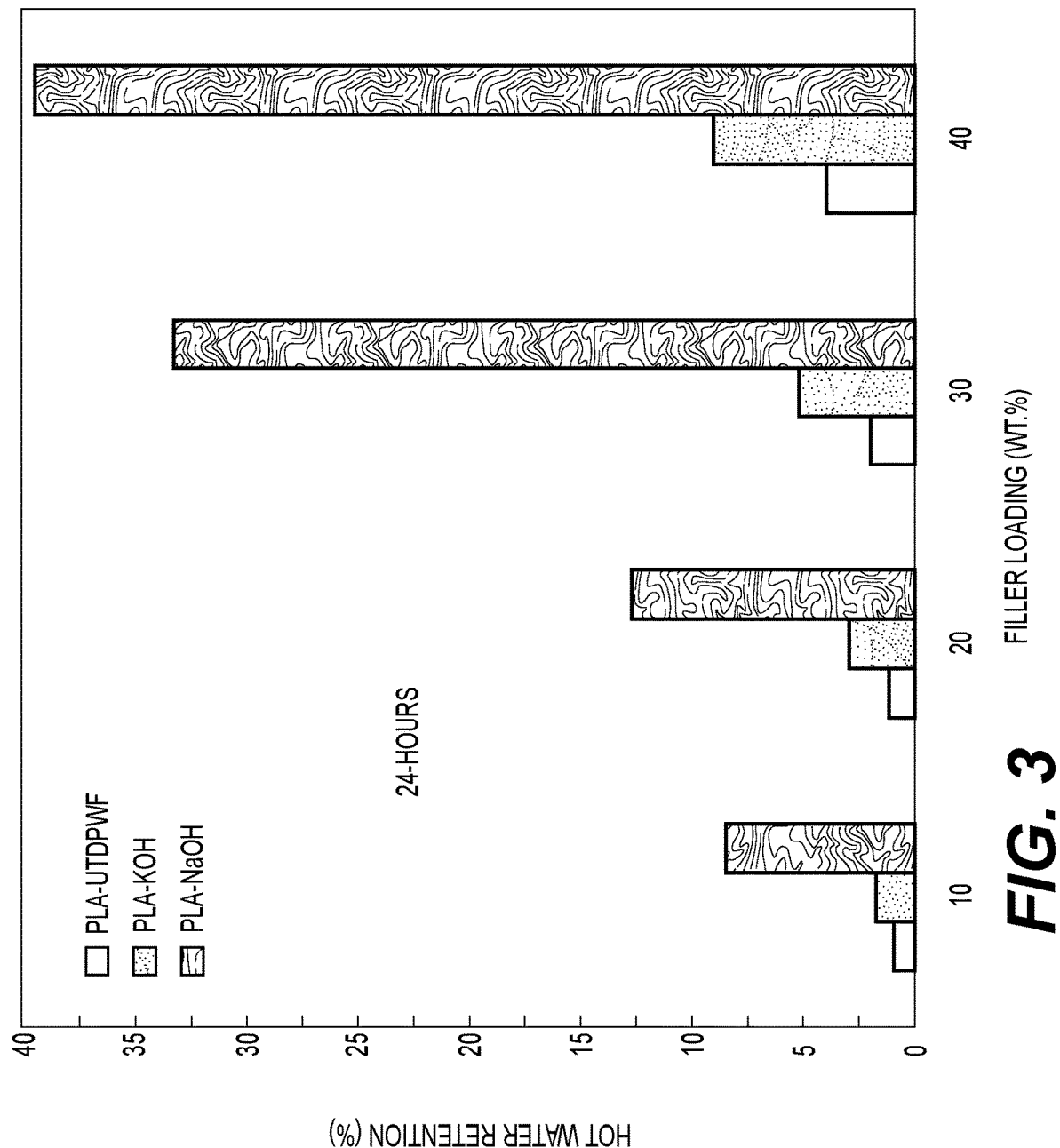
FIG. 3 is a graph comparing water retention results for composite material samples prepared according to the method of making a composite material for dehydration of gases at varying concentrations of date palm wood fiber, and also compared against an untreated control sample, where each sample was submerged in a hot water bath for 24 hours.
Figure 4:
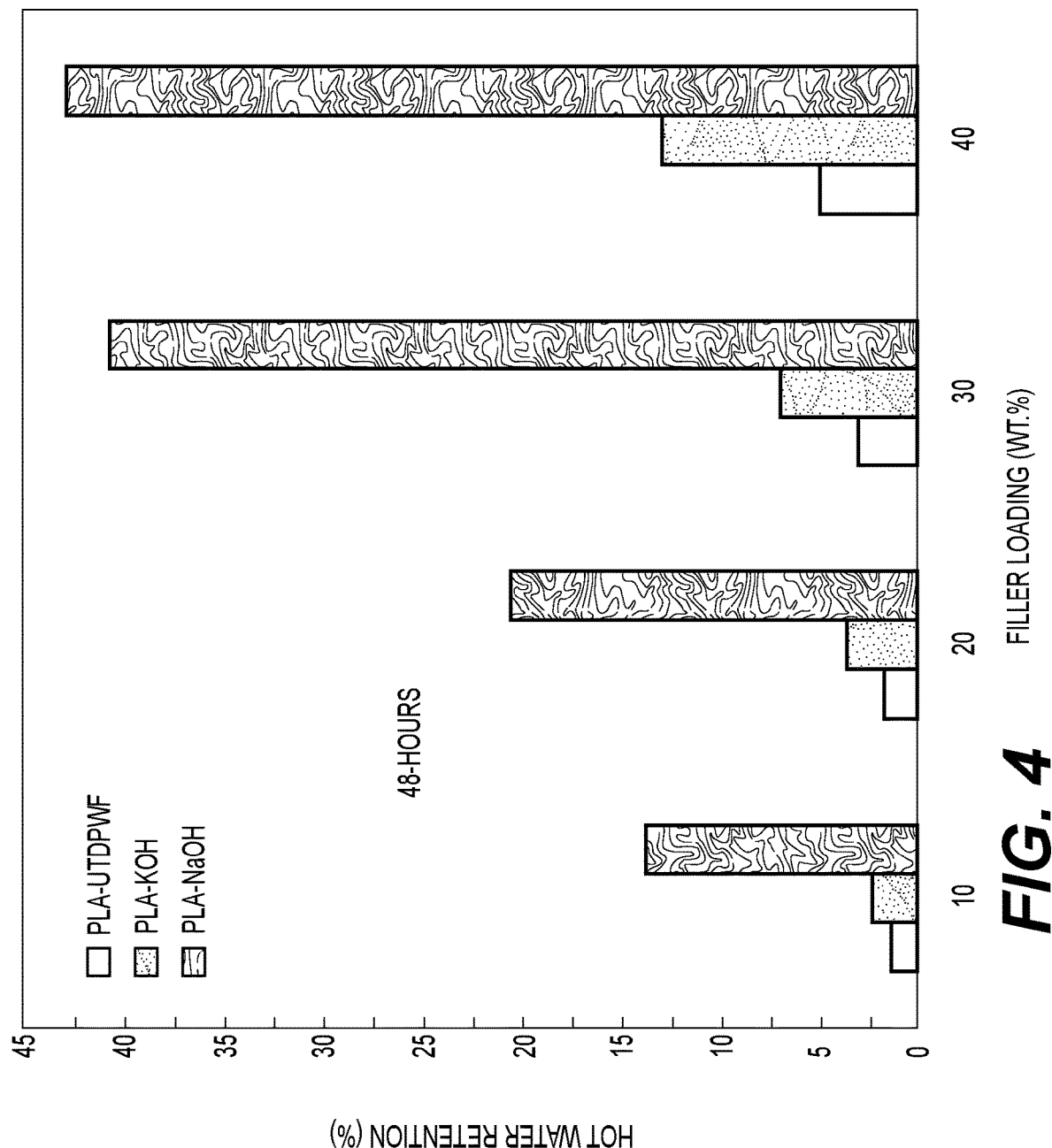
FIG. 4 is a graph comparing water retention results for composite material samples prepared according to the method of making a composite material for dehydration of gases at varying concentrations of date palm wood fiber, and also compared against an untreated control sample, where each sample was submerged in a hot water bath for 48 hours.

FIGS. 1-4 show the results of water retention tests in the PLA-KOH, PLA-NaOH and PLA-UTDPWF samples at differing date palm wood fiber filler concentrations. FIG. 1 shows the water retention results for each sample (with 10 wt %, 20 wt %, 30 wt % and 40 wt % date palm wood fiber filler concentrations) submerged in a cold water bath for 24 hours. FIG. 2 shows the water retention results for each sample submerged in a cold water bath for 48 hours. FIG. 3 shows the water retention results for each sample submerged in a hot water bath for 24 hours, and FIG. 4 shows the water retention results for each sample submerged in a hot water bath for 48 hours. The cold water baths of FIGS. 1 and 2 were at temperatures of 20° C., and the hot water baths of FIGS. 3 and 4 were at temperatures over 50° C. Water retention percentage was calculated as $W_f - W_i/W_i \times 100$, where $W_i$ is the initial weight of the sample (pre-submersion) and $W_f$ is the final weight of the sample (post-submersion).

As can be seen in FIGS. 1-4, water retention is proportional to the filler weight percentage in the composite samples. This proportionality is due to the date palm wood fiber filler's hydrophilic nature. The measured trend for cold and hot water adsorption is similar in the treated and untreated composite samples, with water retention increasing as the proportion of fiber weight increases. The water retention was lowest for the PLA-UTDPWF samples, ranging from 0.23% to 2% for the 10 wt % and 40 wt % samples, respectively. The water intake from the PLA-KOH samples after 48 hours varied from 0.5% to 4.5% for the 10 wt % and 40 wt % filler samples, respectively. The results reveal a much larger water intake for the PLA-NaOH composite samples compared to the PLA-UTDPWF and PLA-KOH composite samples. After 48 hours, the intake of cold water varied between 2.35% and 22.2% for the 10 wt % and 40 wt % filler samples, respectively. Further, hot water adsorbed at a greater percentage than cold water in all samples.

It is to be understood that the methods of making and using a composite material for dehydration of gases are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A method of making a composite material for dehydration of gases, comprising the steps of:
    grinding date palm wood fibers to produce a fiber powder;
    immersing the fiber powder in an alkali solution;
    filtering the fiber powder from the alkali solution to obtain a treated fiber powder;
    drying the treated fiber powder to obtain a dried treated fiber powder;
    mixing the dried treated fiber powder with melted polylactic acid to form a composite material;
    extruding the composite material; and
    molding and pressing the extruded composite material.

2. The method of making a composite material for dehydration of gases as recited in claim 1, wherein the step of grinding the date palm wood fibers is performed until the fiber powder has an average particle diameter of about 212 μm.

3. The method of making a composite material for dehydration of gases as recited in claim 1, wherein the step of immersing the fiber powder in the alkali solution comprises immersing the fiber powder in a 2 wt % aqueous solution of a base selected from the group consisting of NaOH and KOH.

4. The method of making a composite material for dehydration of gases as recited in claim 3, wherein the step of immersing the fiber powder in the alkali solution comprises immersing about 10 g of the fiber powder per 100 mL of the aqueous solution of the base.

5. The method of making a composite material for dehydration of gases as recited in claim 4, wherein the step of immersing the fiber powder in the alkali solution comprises immersing the fiber powder in the aqueous solution of the base for about two hours at room temperature.

6. The method of making a composite material for dehydration of gases as recited in claim 1, wherein the step of drying the treated fiber powder comprises drying the treated fiber powder at a temperature of about 95° C. for about two hours.

7. The method of making a composite material for dehydration of gases as recited in claim 1, wherein the step of molding and pressing the extruded composite material comprises the steps of:
    molding the extruded composite material in a cylindrical mold with a height of about 25.7 mm and a diameter of about 12.8 mm;
    pressing the molded extruded composite material at a pressure of about 0.0039 tons/mm$^2$ for about 320 seconds at a temperature of about 180° C.;
    pressing the molded extruded composite material at a pressure of about 0.0040 tons/mm$^2$ for about 240 seconds at a temperature of about 185° C.; and
    pressing the molded extruded composite material at a pressure of about 0.0233 tons/mm$^2$ for about 210 seconds at a temperature of about 100° C.

8. The method of making a composite material for dehydration of gases as recited in claim 1, wherein the step of mixing the dried treated fiber powder with the melted polylactic acid to form the composite material comprises adding the dried treated fiber powder to the melted polylactic acid such that a concentration of the date palm wood fiber in the composite material is between about 10 wt % and about 40 wt %.

9. A method of dehydrating a gas, comprising the step of contacting a gas with a composite material comprising date palm wood fiber and polylactic acid, wherein a concentration of the date palm wood fiber in the composite material is between about 10 wt % and about 40 wt %.

10. The method of claim 9, wherein water in the gas is adsorbed onto a surface of the composite material.

11. A method of dehydrating a gas, comprising the step of contacting a gas with a composite material manufactured according to the method of claim 1.

* * * * *